United States Patent Office 2,964,950
Patented Dec. 20, 1960

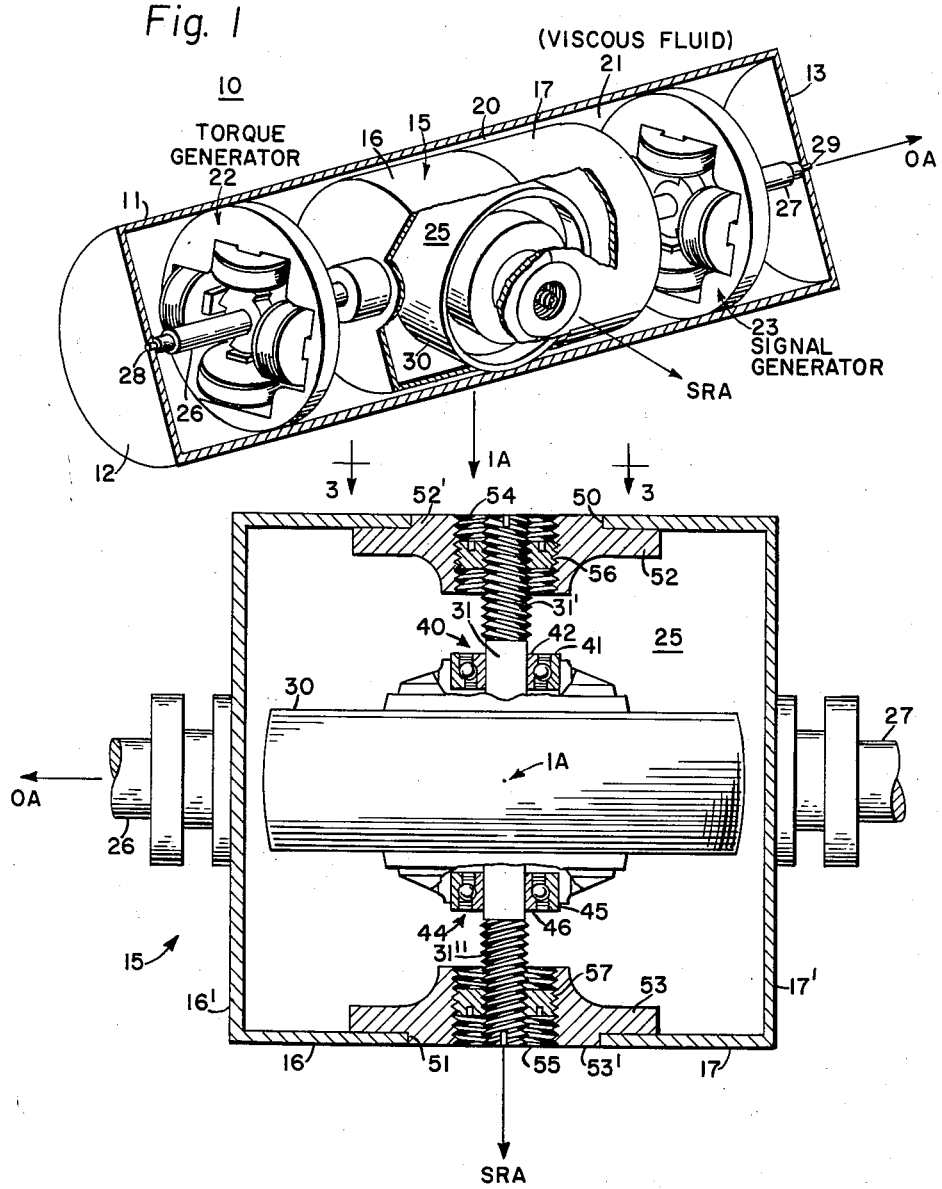

2,964,950

CONTROL APPARATUS

Stephen L. Burgwin, Clearwater, Fla., assignor to Minneapolis-Honeywell Regulator Company, Minneapolis, Minn., a corporation of Delaware Filed May 28, 1958, Ser. No. 738,484

13 Claims. (Cl. 74—5)

This invention pertains to the field of sensitive instruments such as gyroscopes and has specific although not exclusive application to the field of floated gyroscopes. This application is related to a copending application of Stephen L. Burgwin, Bernard M. Gale, and Lawrence E. Goodman (now Patent No. 2,928,281, issued March 15, 1960) and is an improvement over the subject matter of said copending application.

Both the present application and the above identified copending application pertain to the reduction of the anisoelastic torque in gyroscopes. Anisoelastic torque is defined as a torque tending to rotate a gyro gimbal assembly (comprising in part a gyroscopic rotor member) about the gimbal axis or output axis (OA) in response to acceleration either periodic or steady state imposed upon the gimbal assembly which has a component that lies in a plane which includes the spin reference axis (SRA) of the gyroscopic rotor and the input axis (IA) of the gyroscope, the input axis being defined as that axis perpendicular to both the spin reference axis and output axis.

Anisoelastic torque in a gyroscope is determined according to the following formula:

$$T = \frac{M^2 A^2}{4}(K_1 - K_2) \sin 2\alpha$$

Where:

M is the mass of the gyro motor rotor
$K_1$ is the summation of all of the compliances between the center of mass of the motor rotor and the center of buoyancy of the gimbal to acceleration along the IA.
$K_2$ is the summation of all of the compliances between the center of mass of the motor rotor and the center of buoyancy of the gimbal to acceleration along the SRA.
A is the magnitude of the peak sinusoidal acceleration to which the gyro is subjected.
$\alpha$ is the angle in the plane defined by the IA and SRA between the direction of the applied acceleration and the input axis of the gyro.

The term "compliance" as used herein means the amount of deflection of a member for a unit amount of force being applied and also may be expressed as the reciprocal of stiffness.

It will be appreciated that if the quantity $(K_1-K_2)$ may be reduced to zero that the anisoelastic torque accordingly will be reduced to zero. Prior art attempts to reduce this quantity to zero have resulted in the variation or adjustment of the preload on the spin motor bearings to a certain critical point at which the compliance $K_1$ will equal the compliance $K_2$. An example of this is the Slater et al. Patent 2,649,808, issued January 25, 1953. This approach however is unsatisfactory due to the fact that it is not practical on a production basis to attempt to adjust the bearing preload to such a critical setting and furthermore (even if the bearing preload could be so adjusted in the initial manufacture of the gyro) the bearing preload changes over a period of time as the gyro is used due to creepage of components in the gyro, due to temperature effects, and due to mechanical wear of the members of the bearing.

Accordingly, in said copending application of Stephen L. Burgwin, Bernard M. Gale, and Lawrence E. Goodman, there is set forth a means for keeping the magnitude of the quantity $(K_1-K_2)$ as low as possible. The invention of said copending application is based upon the discovery that for a given bearing design there is a critical contact angle between the ball bearings and the inner and outer races of a preloaded pair of bearings for which there is a constant difference between the compliances in the axial and radial directions over a substantial range of preload values. The invention further contemplates the combination of bearings having this critical contact angle with a proper design of the other elements of the gyroscope which contribute to the support of the spin motor bearings so that the compliances of the support means compensate for the constant difference in bearing axial and radial compliances. The invention of the copending application results in a gyro wherein the rotor has substantially equal compliance in the radial and axial directions over a substantial variation of bearing preload and accordingly the anisoelastic torque coefficient is reduced to a minimum value.

The present invention is directed to a means for adjusting the compliance of the means supporting the spin motor bearings so that the quantity $(K_1-K_2)$ becomes zero so as to entirely eliminate anisoelastic torque. The present invention utilizes the optimum contact angle spin motor bearings specifically claimed in said copending application and in addition provides a specific means for adjusting the compliance of the gimbal assembly to acceleration so as to cause the quantities $K_1$ and $K_2$ to be equal.

It is therefore an object of this invention to provide an improved gyroscopic apparatus.

A further object of the invention is to provide means for reducing anisoelastic torque in a gyroscope.

Other objects of this invention will be set forth in the following specification and appended claims in conjunction with accompanying drawings in which:

Figure 1 is an isometric view, partly in section, of a gyroscopic apparatus of the floated type;

Figure 2 is a cross sectional view of a gyro gimbal assembly;

Figure 3:
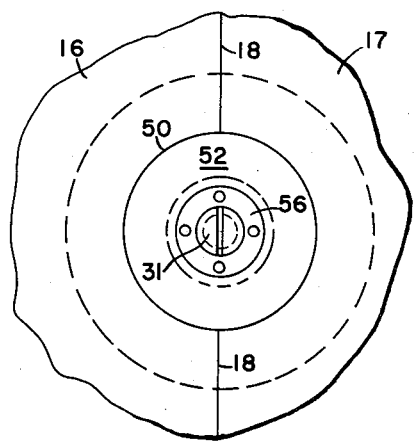
Figure 3 is a detailed view of part of the gimbal assembly shown in Figure 2 as viewed along section lines 3—3.

Referring to Figure 1 a floated gyro is generally depicted by the reference numeral 10 and comprises an outer housing member 11 of general hollow cylindrical form having its ends sealed off by end portions 12 and 13. A gimbal assembly 15 is positioned within housing 11 and comprises in part a pair of cup shaped members 16 and 17 which have their open ends fitted tightly together so that collectively they form a hollow cylindrical member the ends of which are closed off by portions 16' and 17'. The outer diameter of the gimbal housing 16—17 is slightly less than the inner diameter of the outer housing 11 so that a restrictive gap 20 is defined therebetween. A pair of shaft portions 26 and 27 coaxially extend from end portions 16' and 17' respectively and terminate in reduced bearing portions 28 and 29 respectively. These bearing portions 28 and 29 are positioned in suitable delicate bearings not shown in end portions 12 and 13 of the outer housing 11 and define an axis of rotation of the gimbal assembly identified as the output axis (OA).

A viscous fluid 21 of suitable viscosity and of a density approximately equal to the effective density of the gimbal assembly 15 is disposed within housing 11 and completely surrounds the gimbal assembly 15 buoying it up in substantial neutral suspension so that there is virtually no direct loading on the bearings which position the gimbal assembly for rotation about the output axis.

A torque generator 22 and a signal generator 23 are provided in the gyroscope 10 and include stator portions which are mounted within the housing 11 and rotor portions which are attached to shaft members 26 and 27 respectively. Torque generators 22 and 23 are shown because torque generating and signal generating means are usually associated with floated gyros but it should be understood that they form no direct part of the present invention.

A spin motor assembly 25 including a rotor or inertial member 30 is positioned within the hollow hermetically sealed gimbal assembly 15. The spin motor assembly 25 is shown in greater detail in Figure 2 and comprises in part a shaft member 31 upon which is positioned the stator portion (not shown) of the spin motor and also on which are positioned by suitable means the inner races 42 and 46 of a pair of spin motor bearings 40 and 44, the outer races 41 and 45 of which are fastened to the rotor member assembly 30. The bearings 40 and 44 are selected in accordance to the teaching of said copending application so that the difference between the compliance of the gimbal assembly to acceleration in the IA direction and the compliance of the gimbal assembly to acceleration in the SRA direction is constant over a substantially wide variation in bearing preload. No means are shown for varying the preload in the present gyro spin motor but such means are usually provided. One example of means for adjusting bearing preload is shown in said copending application.

Shaft 31 and bearings 40 and 44 therefore define the spin reference axis (SRA) about which the rotor member 30 rotates.

The motor shaft 31 is secured to the gimbal assembly 15 by a unique means which permits the compliance of the shaft 31 to acceleration in the IA direction to be varied without affecting the compliance of the shaft to acceleration in the SRA direction. The two cup members 16 and 17 of the gimbal housing generally abut one another to form a joint 18 which extends circumferentially around the gimbal housing (see Figure 3).

A pair of circular apertures 50 and 51 are provided in the gimbal housing and are centrally located with respect to cup members 16 and 17 and are disposed 180° from each other with respect to the output axis (OA) defined by the shafts 26 and 27. A pair of gimbal housing inserts 52 and 53 are adapted to be positioned in apertures 50 and 51 respectively. Inserts 52 and 53 are generally of larger diameter than apertures 50 and 51 but have reduced portions 52' and 53' respectively which snugly fit in apertures 50 and 51. Centrally located in inserts 52 and 53 are threaded apertures 54 and 55. The spin motor shaft 31 is positioned in apertures 54 and 55 and locked in place by a pair of circular nut members 56 and 57. Shaft 31 is threaded at one end 31' with left hand threads and at the other 31'' with right hand threads. Also aperture 54 and nut 56 are provided with left hand threads and aperture 55 and nut 57 are provided with right hand threads.

The compliance of the shaft 31 to acceleration in the IA direction may be varied by holding the shaft 31 relative to the outer housing 16 and 17 and turning the nuts 56 and 57 inwardly or outwardly which in effect changes the effective length of the shaft 31 which is supporting the spin motor assembly 25. Once the desired amount of compliance of shaft 31 has been obtained by the positioning of nuts 56 and 57 then the entire spin motor shaft may be locked relative to the gimbal assembly or gimbal housing 16—17 by holding the nuts 56 and 57 in place and turning the shaft 31 with respect thereto. Only a slight amount of turning is required in order to lock the shaft, the locking action taking place due to the fact that one end of the shaft 31 has left hand threads and the other end of the shaft has right hand threads. Suitable tool engaging surfaces are provided in the ends of shaft 31 and also in the nuts 56 and 57.

In addition nuts 56 and 57 may be made out of a different material such as stainless steel than the material used for the shaft 31 and the inserts 52 and 53. Thus the adjustment of compliance of the shaft 31 to acceleration in the IA direction may be made at room temperature and then when the gyro is operated the higher operating temperatures will serve to lock the nuts 56 and 57 relative to the shaft 31 due to differential expansion between the inserts 52, 53, the nuts 56 and 57 and the shaft 31, the materials for the shaft and inserts 52 and 53 being selected so as to have a different coefficient of temperature expansion from the shaft 31.

Figure 4:
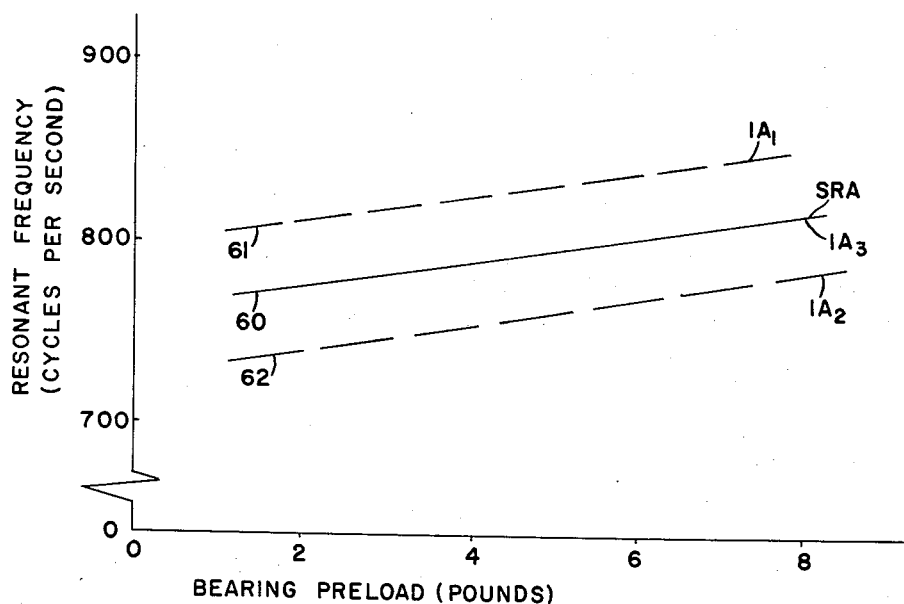
Figure 4 is a graph showing the relationship between bearing preload and the resonant frequency of a gyro gimbal assembly for acceleration applied along the spin reference axis and the input axis.

The adjustment of the nuts 56 and 57 relative to the shaft 31 changes the compliance of the shaft 31 to acceleration in the IA direction without affecting the compliance of the gyro gimbal assembly to acceleration in the SRA direction. In Figure 4 is shown a graph wherein the relationship between gyro resonant frequency measured in cycles per second is plotted as a function of the bearing preload on the spin motor bearings 40 and 44. The resonant frequency ($F_0$) is determined by the following formula:

$$F_0 = \frac{1}{2\pi}\sqrt{\frac{1}{KM}}$$

Where:

K is the compliance of the motor assembly to acceleration in the direction of the applied acceleration and M is the mass of the gyro motor.

It will be noted that the resonant frequency $F_0$ is a function of the compliance of the motor assembly. In Figure 4 therefore the relationship in a sense is that of variation of motor assembly compliance as a function of bearing preload. As the bearing preload is shifted the compliance of the motor assembly will change.

In Figure 4 numeral 60 identifies the plot of variation of resonant frequency to acceleration in the direction of the SRA as a function of bearing preload. It will be noted that this is substantially a straight line function. Then, assuming that the gyroscope has spin motor bearings selected according to the teaching of said copending application the relationship between the resonant frequency to acceleration in the direction of the IA as a function of bearing preload will be a line generally parallel to line 60. Stated otherwise the difference between the compliance to acceleration in the SRA direction and the compliance to acceleration in the IA direction will be equal over a considerable variation in the bearing preload. Ideally the line showing the relationship between resonant frequency and bearing preload for acceleration in the IA direction should be superimposed on line 60 (the corresponding line for acceleration in the SRA direction). However, the line for the acceleration in the IA direction, although parallel to, may not coincide with the line for acceleration in SRA direction. This is indicated in Figure 4 by line 61 which is shown to be parallel to line 60 but for higher frequencies for the same amount of bearing preload and by line 62 for a response that is parallel to line 60 but having lower resonant frequencies for corresponding values of bearing preload.

In the practice of the present invention tests would be made on the gyro gimbal assembly during the construction thereof to determine the relationship between the response of the gimbal assembly to accelerations along the IA direction and the SRA direction. If it is determined that there is a variance such as, for example, the IA curve being at the position corresponding to line 61, then this would indicate that there is too little compliance in the IA direction and nuts 56 and 57 would correspondingly be moved out away from the input axis. For any given gyro design there would be determined the amount of relative shifting between the nuts 56 and 57 required for the necessary shifting of the line 61 in Figure 4 so that it is superimposed on line 60.

It follows also that should the IA curve be in a position corresponding to line 62 in Figure 4 then this would be an indication of too much compliance of the gimbal assembly to acceleration in the IA direction and accordingly the nuts 56 and 57 would be moved in toward the input axis or away from the periphery of the gimbal housing 16—17 as shown in Figure 2. Again the amount of relative movement needed would be determined according to the particular gyro design. It will be appreciated that by proper shifting of nuts 56 and 57 relative to shaft 31 that the line 62 can be shifted upwardly in graph of Figure 4 so that it is superimposed on line 60.

In Figure 4 line 61 is identified as $IA_1$ indicating a condition where there is too little compliance in the input axis direction of the gimbal assembly and curve 62 is identified as $IA_2$ indicating too much compliance of the gimbal assembly to acceleration in the IA direction. Line 60, in addition to being identified as SRA, is also identified as $IA_3$ indicating the compliance of the gimbal assembly to acceleration in the IA direction is identical to the compliance of the gimbal assembly to acceleration in the SRA direction once the nuts 56 and 57 have been adjusted.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What I claim is:

1. A gyroscope having input, output, and spin reference axes comprising a gimbal; a rotor; ball bearing means at each end of said rotor having inner and outer races contacting ball bearings positioned therebetween at a contact angle selected so that the bearing means has a constant difference in compliance in the input axis and spin reference axis directions throughout a substantial range of bearing loading; a shaft supporting said bearing means; and means connecting said shaft to said gimbal, said last named means including a pair of supporting portions on said gimbal each having a threaded aperture, thread means on the ends of said bearing supporting shaft, and a pair of nut-like apertured members threaded internally and externally, said members being positioned in said apertures of said portions with the ends of said shaft extending through the apertures of said members, said members being adjusted along said shaft so as to vary the compliance of said shaft to forces along said input axis without altering the compliance of said shaft to forces along said spin reference axis.

2. A gyroscope having input, output, and spin reference axes comprising a rotor, ball bearing means at each end of said rotor having inner and outer races contacting ball bearings positioned therebetween at a contact angle selected so that the bearing means has a constant difference in compliance in the input axis and spin reference axis directions throughout a substantial range of bearing loading, and means including a shaft supporting said bearing means, said bearing supporting means being characterized by including means for varying the compliance of said shaft in the input axis direction without varying the compliance of said shaft in the spin reference axis direction.

3. A gyroscope having input, output, and spin reference axes comprising a rotor, ball bearing means at each end of said rotor having inner and outer races contacting ball bearings positioned therebetween at a contact angle selected so that the bearing means has a constant difference in compliance in the input axis and spin reference axis directions throughout a substantial range of bearing loading, and means supporting said bearing means, said bearing supporting means being characterized by including means for varying the compliance of said bearing supporting means in the input axis direction without varying the compliance of said bearing supporting means in the spin reference axis direction.

4. A gyroscope having input, output, and spin reference axes comprising a rotor, ball bearing means at each end of said rotor having inner and outer races contacting ball bearings positioned therebetween at a contact angle selected so that the bearing means has a constant difference in compliance in the input axis and spin reference axis directions throughout a substantial range of bearing loading, and means supporting said bearing means, said bearing supporting means being characterized by including means for varying the compliance of said bearing supporting means in the direction of one of said axes without varying the compliance of said bearing supporting means in the direction of one of the other of said axes.

5. A gyroscope having input, output, and spin reference axes comprising a gimbal; a rotor; bearing means connected to said rotor and being characterized by having a constant difference in compliance in the input axis and spin reference axis directions throughout a substantial range of bearing loading; a shaft supporting said bearing means; and means connecting said shaft to said gimbal, said last named means including a pair of supporting portions on said gimbal each having a threaded aperture, thread means on the ends of said bearing supporting shaft, and a pair of nut-like apertured members threaded internally and externally, said members being positioned in said apertures of said portions with the ends of said shaft extending through the apertures of said members, said members being adjusted along said shaft so as to vary the compliance of said shaft to forces along said input axis without altering the compliance of said shaft to forces along said spin reference axis.

6. A gyroscope having input, output, and spin reference axes comprising a rotor, bearing means at each end of said rotor characterized by having a constant difference in compliance in the input axis and spin reference axis directions throughout a substantial range of bearing loading, and means including a shaft supporting said bearing means, said bearing supporting means being characterized by including means for varying the compliance of said shaft in the input axis direction without varying the compliance of said shaft in the spin reference axis direction.

7. A gyroscope having input, output, and spin reference axes comprising a rotor, bearing means at each end of said rotor characterized by having a constant difference in compliance in the input axis and spin reference axis directions throughout a substantial range of bearing loading, and means supporting said bearing means, said bearing supporting means being characterized by including means for varying the compliance of said bearing supporting means in the input axis direction without varying the compliance of said bearing supporting means in the spin reference axis direction.

8. A gyroscope having input, output, and spin reference axes comprising a rotor, bearing means at each end of said rotor characterized by having a constant difference in compliance in the input axis and spin reference axis directions throughout a substantial range of bearing loading and means supporting said bearing means, said bearing supporting means being characterized by including means for varying the compliance of said bearing supporting means in the direction of one of said axes without varying the compliance of said bearing supporting means in the direction of one or the other of said axes.

9. Apparatus for reducing anisoelastic torque in a gyroscope having input, output, and spin reference axes arranged at right angles to one another and comprising a gimbal supported for rotation about said output axis; a motor stator member including a shaft member connected to said gimbal member; a rotor member; bearing means connected to said shaft member and said rotor member for rotatably supporting said rotor for rotation about said spin reference axis; and means for varying the compliance of said shaft in the direction of said input axis, said compliance varying means comprising a pair of supporting portions on said gimbal, a threaded aperture in each of said portions, thread means on the ends of said rotor supporting shaft, and a pair of nut-like members threaded internally and externally, said members being positioned in said apertures with the ends of said shaft extending through said members, said members being adjusted along said shaft so as to vary the compliance of said shaft to acceleration forces along said input axis without altering the compliance of said gyroscope to accelerational forces along said spin reference axis.

10. Apparatus for reducing anisoelastic torque in a gyroscope having a hermetically sealed gimbal floated in a viscous fluid and supported for rotation about an output axis, a shaft mounted in said gimbal, and a rotor rotatably mounted on said shaft for rotation about a spin reference axis, and said spin reference axis being normal to said output axis and said gyroscope having an input axis normal to both said spin reference axis and said output axis, said apparatus comprising means for varying the compliance of said shaft to forces applied to said shaft along said input axis without varying the compliance of said shaft to forces applied to said shaft along said spin reference axis.

11. Apparatus for reducing anisoelastic torque in a gyroscope having a gimbal supported for rotation about an output axis, a rotor, means mounting said rotor on said gimbal for rotation about a spin reference axis, said gyroscope having an input axis normal to both said spin reference axis and said output axis, said apparatus comprising means for varying the compliance of said mounting means to forces applied to said mounting means along said input axis without varying the compliance of said mounting means to forces applied along said spin reference axis.

12. Apparatus for reducing anisoelastic torque in a sensitive instrument having a member supported for rotation about a first axis, a rotor, means mounting said rotor on said member for rotation about a second axis, said second axis being normal to said first axis and said instrument having a third axis normal to both said first and second axes, said apparatus comprising means for varying the compliance of said mounting means to forces applied along said third axis without varying the compliance of said mounting means to forces applied along said second axis.

13. Apparatus for reducing anisoelastic torque in a gyroscope having a gimbal, a rotor, means rotatably mounting said rotor on said gimbal for rotation about a spin reference axis, said gyroscope having an input axis normal to said spin reference axis, and means associated with said mounting means for varying the compliance of said mounting means to accelerational forces applied along one of said axes without varying the compliance of said gyroscope to accelerational forces applied along the other of said axes.

References Cited in the file of this patent

UNITED STATES PATENTS

| | | |
|---|---|---|
| 2,384,838 | Kellogg | Sept. 18, 1945 |
| 2,649,808 | Slater et al. | Aug. 25, 1953 |
| 2,713,270 | Jewell | July 19, 1955 |
| 2,836,981 | Karatzas et al. | June 3, 1958 |